United States Patent
Holliman

[11] Patent Number: 5,365,689
[45] Date of Patent: Nov. 22, 1994

[54] FISHING ROD HOLDER

[76] Inventor: Donald E. Holliman, P.O. Box 1865, Riverdale, Ark. 72377

[21] Appl. No.: 175,235
[22] Filed: Dec. 29, 1993
[51] Int. Cl.⁵ .............................................. A01K 97/10
[52] U.S. Cl. ..................... 43/21.2; 248/515; 248/530
[58] Field of Search ................. 43/21.2; 248/514, 515, 248/530, 538

[56] References Cited

U.S. PATENT DOCUMENTS

| | | | |
|---|---|---|---|
| 2,580,130 | 12/1951 | Rowdon | 43/21.2 |
| 3,063,668 | 11/1962 | Yohe | 43/21.2 |
| 3,385,544 | 5/1968 | Barnett | 43/21.2 |
| 3,835,568 | 9/1974 | Whitfield | 43/21.2 |
| 3,906,653 | 9/1975 | Williams | 43/21.2 |
| 3,924,345 | 12/1975 | Sapp . | |
| 5,009,027 | 4/1991 | Lee . | |
| 5,054,229 | 10/1991 | Hughes . | |
| 5,125,615 | 6/1992 | McGuire . | |
| 5,163,652 | 11/1992 | King . | |

FOREIGN PATENT DOCUMENTS 1158946  6/1958  France ................... 43/21.2

Primary Examiner—P. Austin Bradley
Assistant Examiner—James Miner

[57] ABSTRACT

A device for holding a fishing rod has a rod engaging section which is pivotally affixed to a base section. The base section is attached, preferably rotatably, to a mounting section. The mounting section is constructed such that it can be alternatively clamped onto a wheelchair, or a lawn chair, or the side of a boat, or stuck into a shore/bank using a specially adapted securing stake. The device is constructed such that upon a fish strike, the rod engaging section swivels toward the direction of the applied force, preventing the fish from pulling the rod into the water. A spring loaded screw can be used to lock the rotating rod section into a set, non-rotatable position.

4 Claims, 4 Drawing Sheets

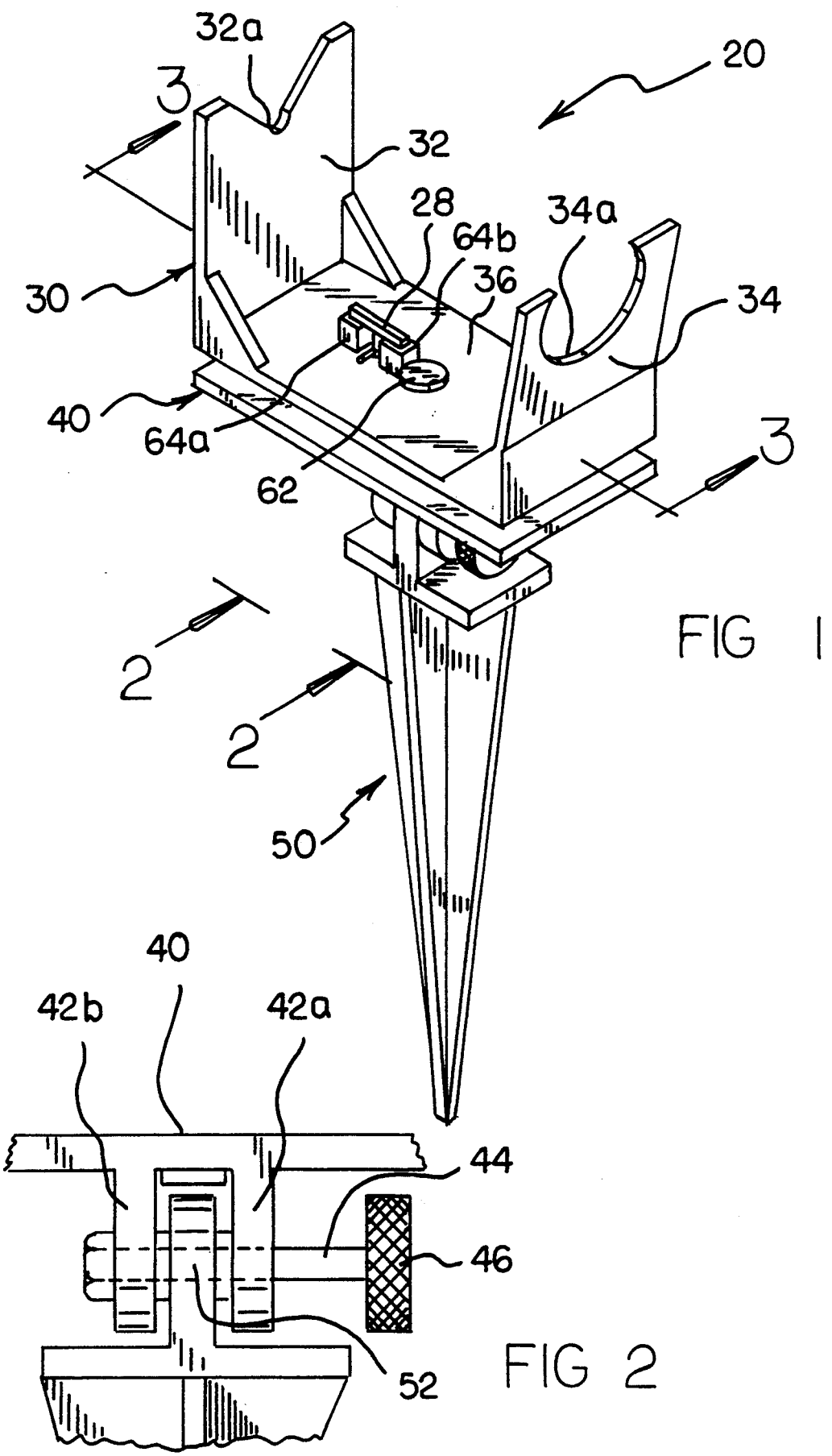

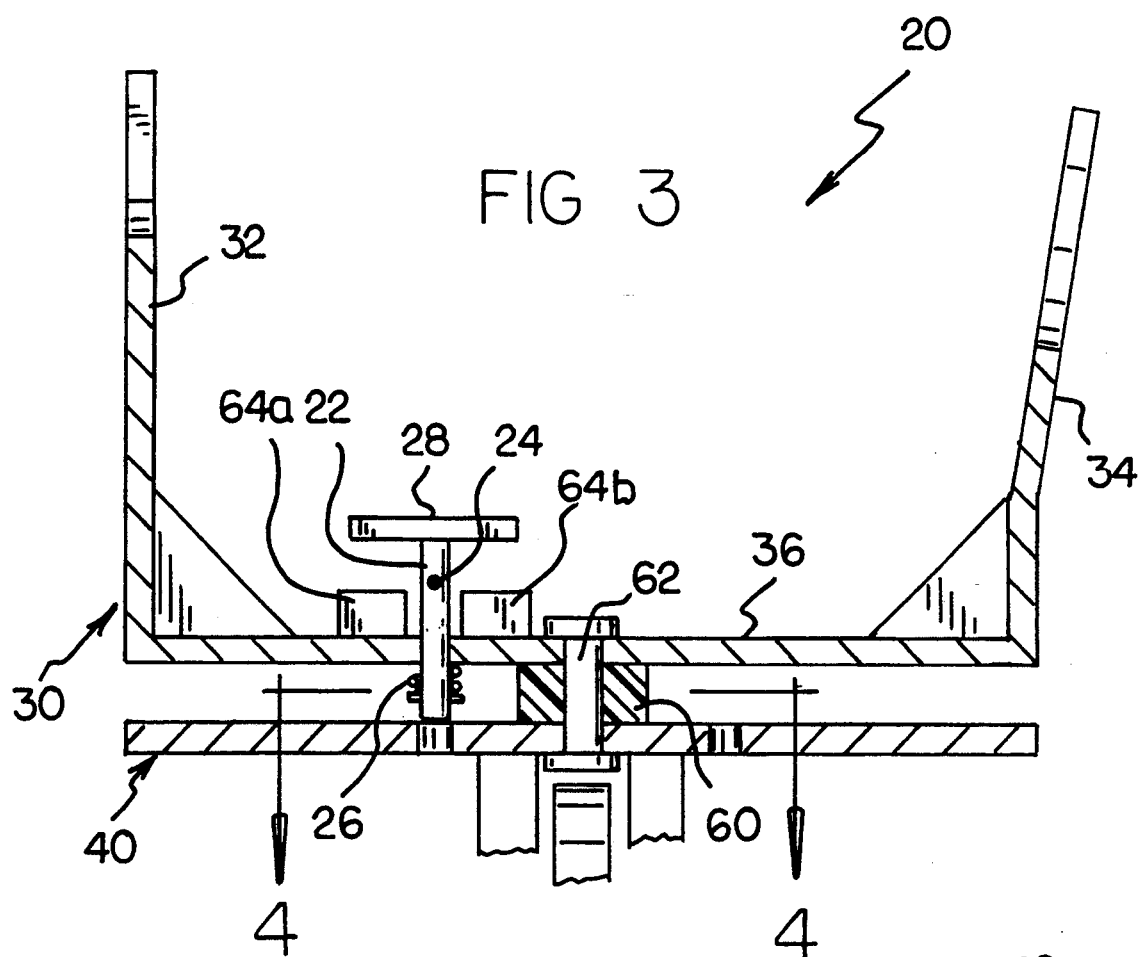
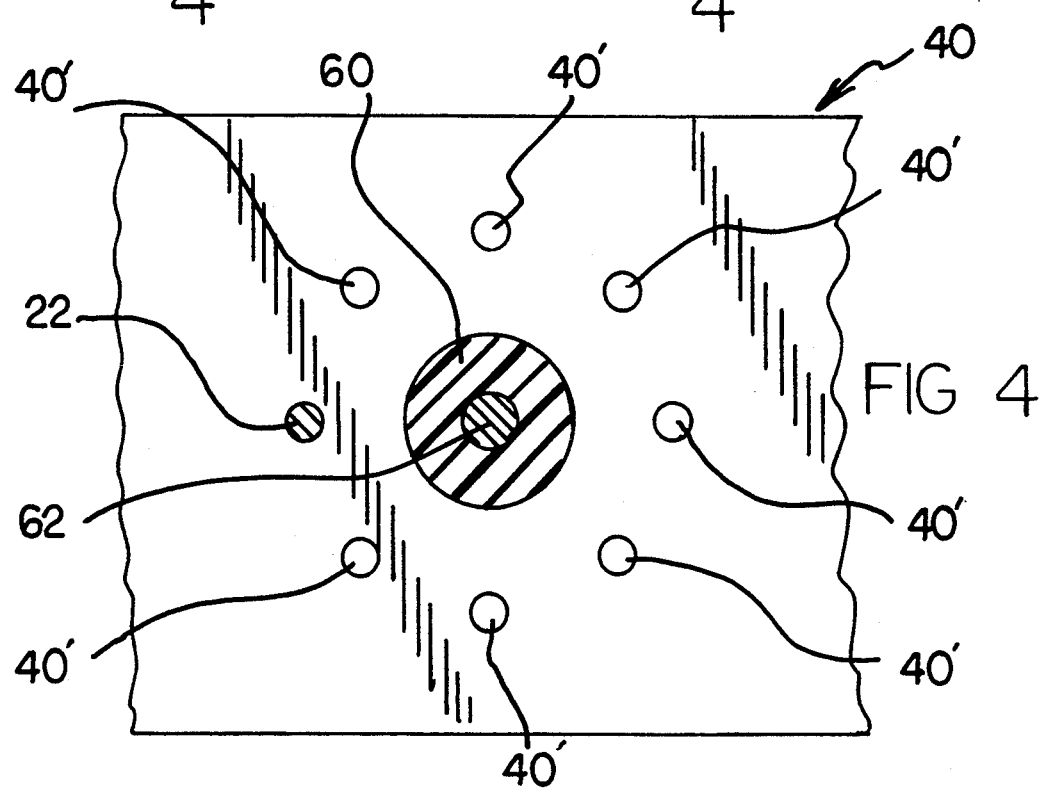

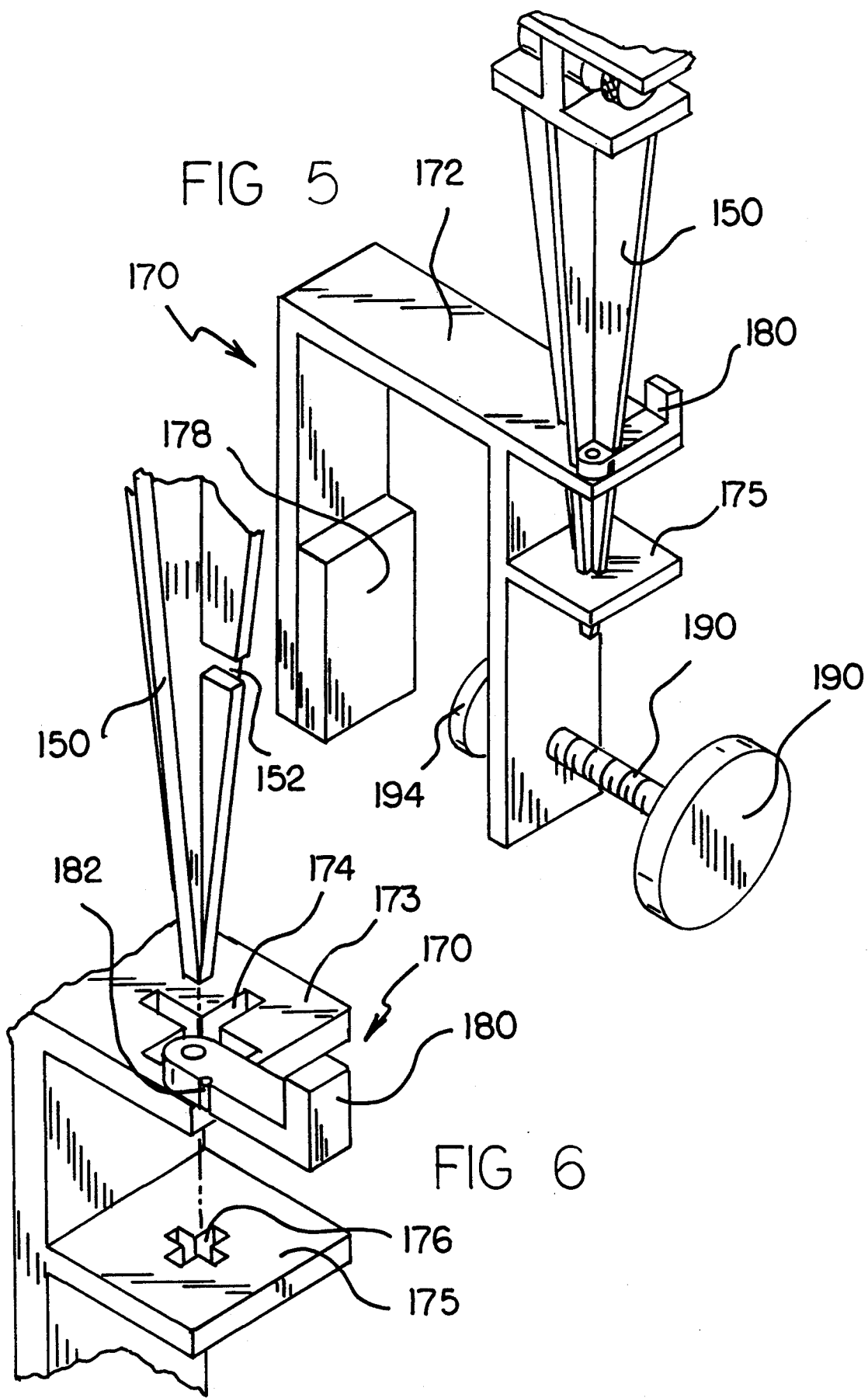

FISHING ROD HOLDER

BACKGROUND OF THE INVENTION

1. Field of the Invention

The present invention relates generally to fishing devices, and more particularly, to a fishing rod holder especially adapted to swivel in the direction a fish strike.

2. Description of the Prior Art

Fishing rod holders in the form of a hollow tubes which can be stuck into the ground are well known in the art of fishing devices. Other rod holders are illustrated by U.S. Pat. Nos. 5,163,652; 5,054,229; and 5,009,027.

Thus, while the foregoing body of prior art indicates it to be well known to use devices such as hollow tubes and the like to hold fishing rods, the provision of a simple and cost effective improved device is not contemplated. Nor does the prior art described above teach or suggest a rod holding device which may be used by individuals fishing alternatively either from a wheelchair, or from a lawn chair, or from a boat or from shore. The foregoing disadvantages are overcome by the unique fishing rod holder of the present invention as will be made apparent from the following description thereof. Other advantages of the present invention over the prior art also will be rendered evident.

SUMMARY OF THE INVENTION

To achieve the foregoing and other advantages, the present invention, briefly described, provides a device for holding a fishing rod having a rod engaging section which is pivotally affixed to a base section. The base section is attached, preferably rotatably, to a mounting section. The mounting section is constructed such that it can be alternatively clamped onto a wheelchair, or a lawn chair, or the side of a boat, or stuck into a shore/bank suing a specially adapted securing stake. The device is constructed such that upon a fish strike, the rod engaging section swivels toward the direction of the applied force, preventing the fish from pulling the rod into the water. A spring loaded screw can be used to lock the rotating rod section into a set, non-rotatable position.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new fishing rod holder which has all of the advantages of the prior art and none of the disadvantages.

It is another object of the present invention to provide a new fishing rod holder which may be easily and efficiently manufactured and marketed.

It is a further objective of the present invention to provide a new fishing rod holder which is of durable and reliable construction.

An even further object of the present invention is to provide a new fishing rod holder which is susceptible of a low cost of manufacture with regard to both materials and labor, and which accordingly is then susceptible of low prices of sale to the consuming public, thereby making such fishing rod holder available to the buying public.

Even yet a further object of the present invention is to provide a fishing rod holder with means for rotating the rod in the direction of a fish strike to prevent the fish from pulling the rod into the water.

Still yet a further object of the present invention is to provide a new fishing rod holder which can be used by handicapped and non-handicapped individuals alike.

It is still a further object of the present invention is to provide a new fishing rod holder having a rod engaging section which is rotatably affixed to a base, the device being operable from either a wheelchair or other chair or a boat or the bank of a shore.

Still a further object of the present invention is to provide a new fishing rod holder including alternative means for mounting the device onto a wheelchair or other type of chair, or to the side of a boat, or having a stake means for sticking the device into the shore bank.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 1 is a perspective view showing the first preferred embodiment of the fishing rod holder of the invention.

FIG. 2 is a cross-sectional side view of the fishing rod holder along line 2—2 of FIG. 1.

FIG. 3 is a cross-sectional view of the fishing rod holder of FIG. 1 taken along line 3—3 thereof in accordance with the present invention.

FIG. 4 is a perspective view from below of FIG. 3 taken along line 4 thereof in accordance with the preferred embodiment of the invention.

FIG. 5 is a perspective view in elevation of a second preferred embodiment of the present invention shown in a locked position.

FIG. 6 is a partial cross-sectional view in elevation of the second preferred embodiment of the invention shown in an unlocked position.

DESCRIPTION OF THE PREFERRED EMBODIMENT

Figure 7:
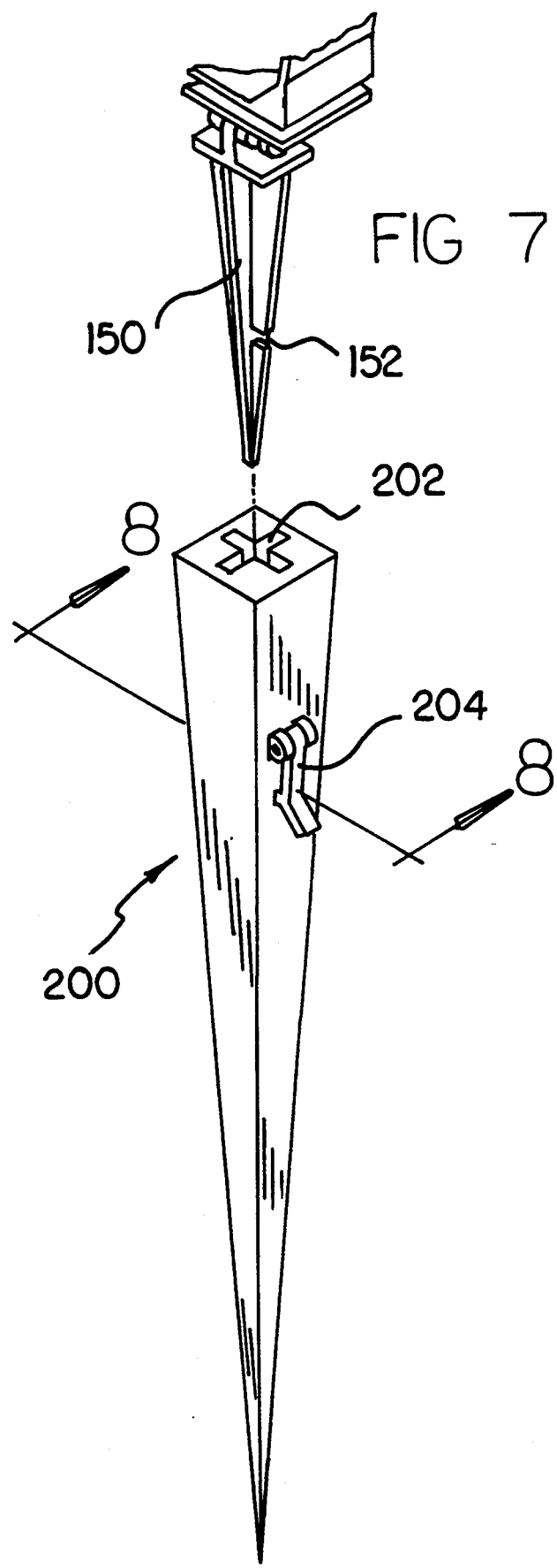
FIG. 7 is a perspective view in elevation of a third preferred embodiment of the present invention.

With reference now to the drawings, a new fishing rod holder embodying the principles and concepts of the present invention will be described.

Turning initially to FIGS. 1-4, there is shown a first exemplary, embodiment of the fishing rod holder of the invention generally designated by reference numeral 20. In its preferred form, fishing rod holder 20 comprises generally a rod engaging section 30, a base section 40, and a stake section 50.

The rod engaging section has a first upright 32 for supporting a fishing rod in a V-shaped cutout 32a and a slanted second upright 34 for supporting the handle of the rod in a open topped O-shaped cutout 34a. Piece 36 runs between the uprights 32 and 34.

The base section 40, seen best in FIGS. 2 and 4, has a plurality of holes 40' in base section 40 running around a centrally located hole. First and second drop-out pieces 42a, 42b (each with a central hole not shown in the figures) adjust from the bottom of the base section 40. An end threaded tilt lock piece 44 runs through the holes in drop out pieces 42a and 42b. The tilt lock piece 44 can be used to pivot/tilt the base 40 and rod engaging section 30 with respect to the stake section 50 by adjusting the turning knob 46 of lock piece 44 and the threaded nut 48 rotatably engaged with the threaded end of lock piece 44.

The device is specially adapted to swivel in the direction of a fish strike. A spring loaded lock piece 22 having a locking pin 24 and a spring 26 and a swivel release bar 28 is mounted on and goes through a hole (not shown in the figures) in the piece 36 running between the uprights 32 and 34 of rod engaging section 30. First and second engagement blocks 64a and 64b prevent release bar 28 from moving to far down toward piece 36.

The ground stake section 50, which is shaped such that it can be easily stuck into the ground of a shore or bank, has a drop up piece 52 (see FIG. 2) with a central hole (not shown in the Figures). The ground stake 50 is attached to the base 40 by means of the turning knob 46 of lock piece 44 and the correspondingly threaded nut 48 rotatably engaged with the threaded end of lock piece 44.

A rotatable affixing piece 62 runs between rod engaging section 30 and base section 40 and holds them together except that a plastic separating pad 60 keeps them slightly separated so that they do not scrape against each other.

Use of the device 20 is very simple. A fishing rod can be place in the rod engaging section 30 with the rod's handle in slot 34a and another part of the rod resting in V-shaped slot 32a. Tilt lock 44 can be set into a proper tilt angle by turning knob 46 appropriately. Next release bar 28 can be pulled up to pull lock piece 22 out of one of the holes 40'.

By rotating the rod engaging section 30 slightly with respect to base 40 (to move piece 22 away from being directly over any of the holes 40') around rotating piece 62, the rod will be able to rotate toward the direction of a fish strike. Once the rod moves toward the fish strike, as the lock piece 22 passes over one of the holes 40' the spring 26 will urge the lock piece 22 into the hole 40', locking the rod engaging section 30 in place.

The first embodiment is intended for use on a shore or bank into which the stake 50 can be driven. The next embodiment can be used form a boat or chair, particularly from a wheelchair.

A second embodiment stake 150 having a special notch 152 is shown in FIGS. 5 and 6 along with a clamp 170 which can be clamped to a chair or the side of a boat. The clamp 170 is comprised of a U-shaped bracket 172 having a first outward projecting ledge 173 with a large cross shaped engaging hole 174 and a second outward projecting ledge 175 with a small cross shaped engaging hole 176. The clamp 170 also preferably has a contacting pad 178.

A spring loaded latch 180 with spring 182 is mounted on the first projecting ledge 173. The spring 182 normally urges the latch 180 into the closed position of FIG. 5. The latch 180 is shown held into the open position, against the force of spring 182, in FIG. 6.

A threaded clamp rod 190 having a turning knob 192 and a contacting knob 194 goes through a hole (not shown in the Figures) in the U-shaped bracket 172.

The use of the second embodiment is the same as the use of the first embodiment with the addition of being able to clamp the device to the side of a boat or to a chair. This is particularly helpful to handicapped individuals who, until now, have not been able to fully enjoy all of the aspects of fishing. The clamp 170 is mounted onto the side of a boat or a chair by placing the U-shaped bracket 172 over the chair arm or the boat rail and then turning knob 190 until knob 194 presses against one side of the rail or arm and pad 178 presses against the other. Knob 190 should turned until the clamp 170 is tightly positioned. Next, notched stake 150 should be guided through slot 1.74 and then slot 176. Spring loaded latch 180 should be closed over notch 152 in stake 150 and the device will be tightly held in position.

Figure 8:
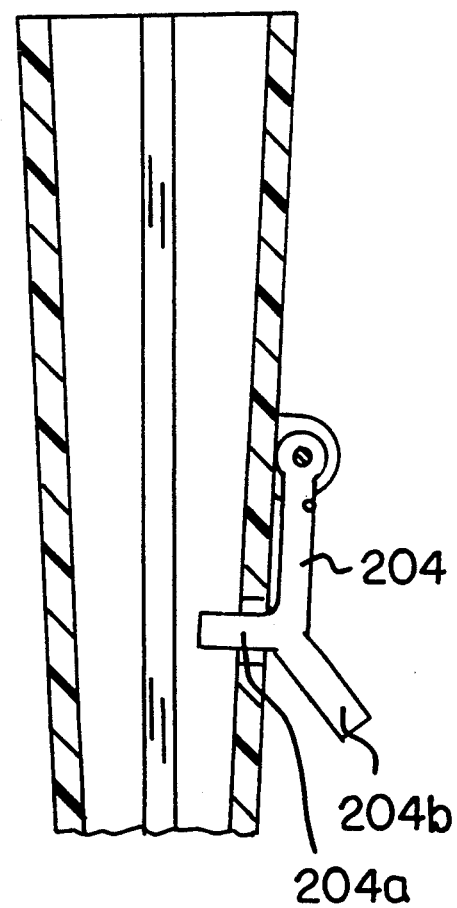
FIG. 8 is a cross-sectional view in elevation of the second preferred embodiment of the invention taken along 8—8 of FIG. 7.

A special third embodiment having the addition of a stake extender 200 is shown in FIGS. 7 and 8. The stake extender 200 works with notched stake 150 used in FIGS. 5 and 6. The stake extender 200 has a cross shaped slot 202 and a release 204 having a catch piece 204a and a finger grip piece 204b.

The third embodiment is also easy to use. In the case of soft sand or ground, it is advisable to have more surface area of the stake stuck into the ground. By sticking the stake 150 in to the slot 202 of the stake extender 200 and then closing the catch piece 204a over the slot 152, a much longer stake is created which can be used for soft sand or ground.

It is apparent from the above that the present invention accomplishes all of the objectives set forth by providing a new fishing rod holder for supporting the fishing rod from a permanent structure or the ground, the fishing rod holder comprising: a rod engaging section constructed to hold the fishing rod; and a base section having a mounting means for at least temporarily mounting on the permanent structure or the ground, the rod engaging section rotatably affixed to the base section. The rod engaging section can rotate towards the direction of any applied force on the fishing rod such as a fish strike. The mounting means can be a clamping means. The clamping means can be used to attach the device alternatively to a wheelchair or other chair or to the side of a boat. The mounting means can be a stake means which can be used to stick the device in to the shore. The invention can further comprise a stake extending means for increasing the length of the stake means for use when the shore is soft. The mounting means can comprise a stake means and a separate clamping means, the stake specially constructed to attach to the clamping means; whereby the device can alternatively be used in the shore or from the side of a chair or boat.

The present invention can be made out of steel or preferably plastic, although any suitable material should be considered within the scope of the invention. Use of the present invention leaves both hands free to perform other tasks. The device can be used by anyone, but will be especially valuable to those who are handicapped and do not have full use of the hands and arms.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters patent of the United States is as follows:

1. A fishing rod holder for supporting a fishing rod, the fishing rod holder comprising:
   a rod engaging section including a substantially planar base piece with a first upright extending substantially upwardly from said base piece, said first upright having a V-shaped cutout for receiving and supporting a portion of a fishing rod within said V-shaped cutout, said rod engaging section further comprising a second upright projecting upwardly from said base piece, said second upright having an O-shaped cutout for receiving and supporting a handle of said fishing rod in said O-shaped cutout;
   a substantially planar base section pivotally mounted to said base piece of said rod engaging section, said base section having a centrally located hole extending therethrough and a plurality of through-extending holes arranged in an annular array positioned concentrically about said centrally located hole, said base section further having a top side and a bottom side with first and second drop-out pieces projecting from said bottom side thereof, said drop-out pieces being positioned in a spaced relationship;
   and a stake section for insertion into a ground surface, said stake section having an upwardly projecting drop-up piece extending between said drop-out pieces;
   a threaded tilt lock piece projecting through both said first and second drop out pieces and said drop-up piece of said stake section, said threaded tilt lock piece being operable to selectively permit and preclude pivoting of said base section relative to said stake section;
   and,
   means for selectively permitting and precluding pivoting of said rod engaging section relative to said base section, said means comprising a spring loaded lock piece having a locking pin and a swivel release bar, said lock piece being slidably mounted through a hole in said base piece with said locking pin projecting therethrough to selectively engage one of said annular array of through-extending holes in said base section.

2. A fishing rod holder for supporting a fishing rod, the fishing rod holder comprising:
   a rod engaging section including a substantially planar base piece with a first upright extending substantially upwardly from said base piece, said first upright having a V-shaped cutout for receiving and supporting a portion of a fishing rod within said V-shaped cutout, said rod engaging section further comprising a second upright projecting upwardly from said base piece, said second upright having an O-shaped cutout for receiving and supporting a handle of said fishing rod in said O-shaped cutout;
   a substantially planar base section pivotally mounted to said base piece of said rod engaging section, said base section having a centrally located hole extending therethrough and a plurality of through-extending holes arranged in an annular array positioned concentrically about said centrally located hole, said base section further having a top side and a bottom side with first and second drop-out pieces projecting from said bottom side thereof, said drop-out pieces being positioned in a spaced relationship;
   and a stake section for insertion into a ground surface, said stake section having an upwardly projecting drop-up piece extending from said stake section between said drop-out pieces, said stake section including a notch formed therein;
   a threaded tilt lock piece projecting through both said first and second drop out pieces and said drop-up piece of said stake section, said threaded tilt lock piece being operable to selectively permit and preclude pivoting of said base section relative to said stake section;
   means for selectively permitting and precluding pivoting of said rod engaging section relative to said base section, said means comprising a spring loaded lock piece having a locking pin and a swivel release bar, said lock piece being slidably mounted through a hole in said base piece with said locking pin projecting therethrough to selectively engage one of said annular array of through-extending holes in said base section; and, a clamp selectively coupleable to said stake section, said clamp comprising a U-shaped bracket having a first outward projecting ledge with a first through-extending engaging hole and a second outward projecting ledge with a second through-extending engaging hole, whereby said stake section extends through said first and second engaging holes, with a latch pivotally mounted to said first outward projecting ledge, said latch being selectively pivotable into engagement with said notch of said stake section to retain said stake section within said engaging holes, and a threaded clamp rod projecting through and threadably engaged to said U-shaped bracket for clamping said clamp to an object.

3. The fishing rod holder of claim 2, wherein said stake section is substantially tapered and has a substantially cross shaped cross-section, and said first engaging hole comprises a correspondingly cross shaped hole and said second engaging hole comprises a correspondingly cross shaped hole, wherein said first engaging hole is substantially larger than said second engaging hole.

4. A fishing rod holder for supporting a fishing rod, the fishing rod holder comprising:

a rod engaging section including a substantially planar base piece with a first upright extending substantially upwardly from said base piece, said first upright having a V-shaped cutout for receiving and supporting a portion of a fishing rod within said V-shaped cutout, said rod engaging section further comprising a second upright projecting upwardly from said base piece, said second upright having an O-shaped cutout for receiving and supporting a handle of said fishing rod in said O-shaped cutout;

a substantially planar base section pivotally mounted to said base piece of said rod engaging section, said base section having a centrally located hole extending therethrough and a plurality of through-extending holes arranged in an annular array positioned concentrically about said centrally located hole, said base section further having a top side and a bottom side with first and second drop-out pieces projecting from said bottom side thereof, said drop-out pieces being positioned in a spaced relationship;

and a stake section for insertion into a ground surface, said stake section being substantially tapered and having a substantially cross shaped cross-section with an upwardly projecting drop-up piece extending from said stake section between said drop-out pieces, said stake section including a notch formed therein;

a threaded tilt lock piece projecting through both said first and second drop out pieces and said drop-up piece of said stake section, said threaded tilt lock piece being operable to selectively permit and preclude pivoting of said base section relative to said stake section;

means for selectively permitting and precluding pivoting of said rod engaging section relative to said base section, said means comprising a spring loaded lock piece having a locking pin and a swivel release bar, said lock piece being slidably mounted through a hole in said base piece with said locking pin projecting therethrough to selectively engage one of said annular array of through-extending holes in said base section; and, a stake extender, said stake extender having a cross shaped slot extending therethrough receiving said stake section, said stake extender further having a through-extending aperture extending substantially orthogonally relative to said cross shaped slot, and a release member pivotally mounted to said stake extender, said release member having a catch piece projecting through said aperture in said stake extender to engage said notch in said stake section to selectively retain said stake section within said cross shaped slot of said stake extender.

* * * * *